(12) United States Patent
Eckert

(10) Patent No.: US 10,494,050 B2
(45) Date of Patent: Dec. 3, 2019

(54) STEERING MECHANISM FOR SCOOTER

(71) Applicant: Radio Flyer Inc., Chicago, IL (US)

(72) Inventor: Cameron Eckert, Chicago, IL (US)

(73) Assignee: Radio Flyer Inc., Chicago, IL (US)

( * ) Notice: Subject to any disclaimer, the term of this patent is extended or adjusted under 35 U.S.C. 154(b) by 510 days.

(21) Appl. No.: 14/953,395

(22) Filed: Nov. 29, 2015

(65) Prior Publication Data
US 2016/0152296 A1 Jun. 2, 2016

Related U.S. Application Data

(60) Provisional application No. 62/085,750, filed on Dec. 1, 2014.

(51) Int. Cl.
| | | |
|---|---|---|
| *B62K 21/12* | (2006.01) | |
| *B62K 3/00* | (2006.01) | |
| *A63C 17/01* | (2006.01) | |
| *B62B 3/00* | (2006.01) | |

(52) U.S. Cl.
CPC .............. *B62K 21/12* (2013.01); *B62K 3/002* (2013.01); *A63C 17/012* (2013.01); *B62B 3/007* (2013.01)

(58) Field of Classification Search
CPC ........... B62B 3/001; B62B 3/007; B62B 3/12; B62B 5/0033; B62K 21/005; B62K 11/14; B62K 3/002; A63C 17/00; A63C 17/0046; A63C 17/04; A63C 2203/20; A63C 17/012
See application file for complete search history.

(56) References Cited

U.S. PATENT DOCUMENTS

| | | | |
|---|---|---|---|
| 2,051,762 A | | 8/1936 | Vincent |
| 3,442,528 A | | 5/1969 | Rademacher |
| 3,751,062 A | | 8/1973 | White, Sr. |
| 3,870,324 A | | 3/1975 | Balstad |
| 4,061,351 A | | 12/1977 | Bangle |
| 4,103,917 A | * | 8/1978 | Widolf ................. A63C 17/01 280/11.28 |
| 4,245,848 A | * | 1/1981 | Dudouyt ............... A63C 17/01 280/11.28 |
| 4,732,400 A | | 3/1988 | Santini |

(Continued)

FOREIGN PATENT DOCUMENTS

| | | |
|---|---|---|
| DE | 102012007780 | 8/2013 |
| FR | 2564411 | 11/1985 |

OTHER PUBLICATIONS

International Search Report for related International Application No. PCT/US2015/062964, dated Mar. 16, 2016.

*Primary Examiner* — James A Shriver, II
*Assistant Examiner* — Vaughn Coolman
(74) *Attorney, Agent, or Firm* — Barnes & Thornburg LLP

(57) ABSTRACT

A scooter is provided having a deck, a handlebar connected to the deck, a front wheel assembly, a rear wheel assembly and a steering mechanism. The steering mechanism has a steering post and a longitudinally extending spring member that has a plurality of transverse planar surfaces. A first spring member cavity is provided adjacent the front wheel assembly to receive the first end of the spring member, and a second spring member cavity is provided adjacent the deck to receive the second end of the spring member. A bushing is positioned between the deck and the front wheel assembly to allow the deck to rotate with respect to the front wheel assembly.

17 Claims, 7 Drawing Sheets

(56) References Cited

U.S. PATENT DOCUMENTS

| | | | | |
|---|---|---|---|---|
| 4,811,971 | A | 3/1989 | Phillips | |
| 5,154,436 | A | 10/1992 | Jez et al. | |
| 5,263,725 | A | 11/1993 | Gesmer et al. | |
| 5,522,620 | A | 6/1996 | Pracas | |
| 5,879,013 | A * | 3/1999 | Shih | A63C 17/01 280/11.28 |
| 6,199,880 | B1 | 3/2001 | Favorito et al. | |
| 6,213,484 | B1 | 4/2001 | Rohner | |
| 6,279,930 | B1 | 8/2001 | Chang et al. | |
| 6,286,843 | B1 | 9/2001 | Lin | |
| 6,299,186 | B1 | 10/2001 | Kao et al. | |
| 6,315,304 | B1 | 11/2001 | Kirkland et al. | |
| 6,315,312 | B1 | 11/2001 | Reyes et al. | |
| 6,341,672 | B1 | 1/2002 | Yang et al. | |
| 6,341,790 | B1 | 1/2002 | Chen | |
| 6,382,646 | B1 | 5/2002 | Shaw | |
| 6,398,238 | B1 | 6/2002 | Shaw | |
| 6,409,191 | B1 | 6/2002 | Wang et al. | |
| 6,428,023 | B2 | 8/2002 | Reyes et al. | |
| 6,520,516 | B2 | 2/2003 | Favorito et al. | |
| 6,520,517 | B1 | 2/2003 | Chung et al. | |
| 6,523,837 | B2 | 2/2003 | Kirkland | |
| 6,557,873 | B2 | 5/2003 | Nardone | |
| 6,739,603 | B1 * | 5/2004 | Powell | A63C 17/0093 280/11.27 |
| 6,758,789 | B1 | 7/2004 | Wang et al. | |
| 6,793,224 | B2 | 9/2004 | Stratton | |
| 6,913,272 | B2 * | 7/2005 | Chang | A63C 17/0046 280/11.28 |
| 6,938,907 | B2 | 9/2005 | Hamy | |
| 6,981,710 | B2 | 1/2006 | Cheng | |
| 7,040,443 | B1 * | 5/2006 | Roth | B62K 3/002 180/220 |
| 7,083,177 | B1 | 8/2006 | Chen | |
| 7,121,566 | B2 | 10/2006 | McClain | |
| 7,140,621 | B2 | 11/2006 | Cheng | |
| 7,159,879 | B2 | 1/2007 | Cole | |
| 7,219,907 | B2 | 5/2007 | Chang | |
| 7,243,931 | B2 | 7/2007 | Chen | |
| 7,303,199 | B2 | 12/2007 | Chen | |
| 7,314,223 | B2 | 1/2008 | Lin | |
| 7,316,408 | B2 | 1/2008 | McClain | |
| 7,413,200 | B2 | 8/2008 | Horn | |
| 7,438,303 | B2 | 10/2008 | Cole | |
| 7,487,988 | B2 | 2/2009 | Kettler et al. | |
| 7,810,825 | B2 | 10/2010 | Cole | |
| 8,152,176 | B2 | 4/2012 | Wilson et al. | |
| 8,186,694 | B2 | 5/2012 | Nelson et al. | |
| 8,246,058 | B2 | 8/2012 | Wang et al. | |
| 8,251,384 | B1 | 8/2012 | Christensen et al. | |
| 8,292,311 | B2 | 10/2012 | De Las Casas | |
| 8,448,954 | B2 | 5/2013 | Wilson | |
| 8,469,377 | B2 | 6/2013 | Wilson et al. | |
| 8,579,300 | B2 | 11/2013 | Fraley | |
| D698,868 | S | 2/2014 | Chan | |
| 8,696,000 | B1 | 4/2014 | Chen | |
| 8,740,236 | B2 * | 6/2014 | Ouboter | B62K 3/002 280/200 |
| 8,752,849 | B1 | 6/2014 | Fox | |
| 8,939,454 | B2 | 1/2015 | Stillinger et al. | |
| 8,985,602 | B2 | 3/2015 | Chan | |
| 9,346,512 | B2 * | 5/2016 | Yeh | B62K 5/05 |
| 9,522,710 | B2 * | 12/2016 | Constien | B62H 1/02 |
| 2001/0038187 | A1 | 11/2001 | Reyes et al. | |
| 2002/0011713 | A1 | 1/2002 | Kirkland | |
| 2002/0084602 | A1 | 7/2002 | Feng | |
| 2002/0096846 | A1 | 7/2002 | Chen | |
| 2002/0135147 | A1 | 9/2002 | Lee | |
| 2002/0149165 | A1 | 10/2002 | Lin | |
| 2002/0167144 | A1 | 11/2002 | Guang-Gwo | |
| 2002/0180169 | A1 | 12/2002 | Kwok | |
| 2003/0098555 | A1 | 5/2003 | Chen | |
| 2003/0141689 | A1 | 7/2003 | Hamy | |
| 2003/0188906 | A1 | 10/2003 | Bank | |
| 2004/0100053 | A1 | 5/2004 | Chen | |
| 2004/0145142 | A1 | 7/2004 | Wang | |
| 2005/0012290 | A1 | 1/2005 | McClain | |
| 2005/0093262 | A1 | 5/2005 | Chang | |
| 2005/0140108 | A1 | 6/2005 | Chen | |
| 2006/0220336 | A1 | 10/2006 | Lin | |
| 2007/0035099 | A1 | 2/2007 | Chen | |
| 2007/0035102 | A1 | 2/2007 | McClain | |
| 2007/0164530 | A1 | 7/2007 | Horn | |
| 2009/0273152 | A1 | 11/2009 | Chung | |
| 2010/0001484 | A1 | 1/2010 | Cole | |
| 2010/0123295 | A1 | 5/2010 | Landau | |
| 2010/0327546 | A1 | 12/2010 | Nelson et al. | |
| 2011/0031711 | A1 | 2/2011 | Grossman | |
| 2011/0042913 | A1 | 2/2011 | Landau | |
| 2011/0227305 | A1 | 9/2011 | Chen | |
| 2012/0181773 | A1 | 7/2012 | Ouboter | |
| 2013/0001909 | A1 | 1/2013 | Stillinger et al. | |
| 2013/0175790 | A1 | 7/2013 | Wurst | |
| 2013/0307240 | A1 | 11/2013 | Petuschnig | |
| 2014/0042717 | A1 | 2/2014 | Chan | |
| 2015/0061252 | A1 * | 3/2015 | Lininger, Jr. | A63C 17/0093 280/87.042 |
| 2016/0339984 | A1 * | 11/2016 | Li | B62J 7/06 |

\* cited by examiner

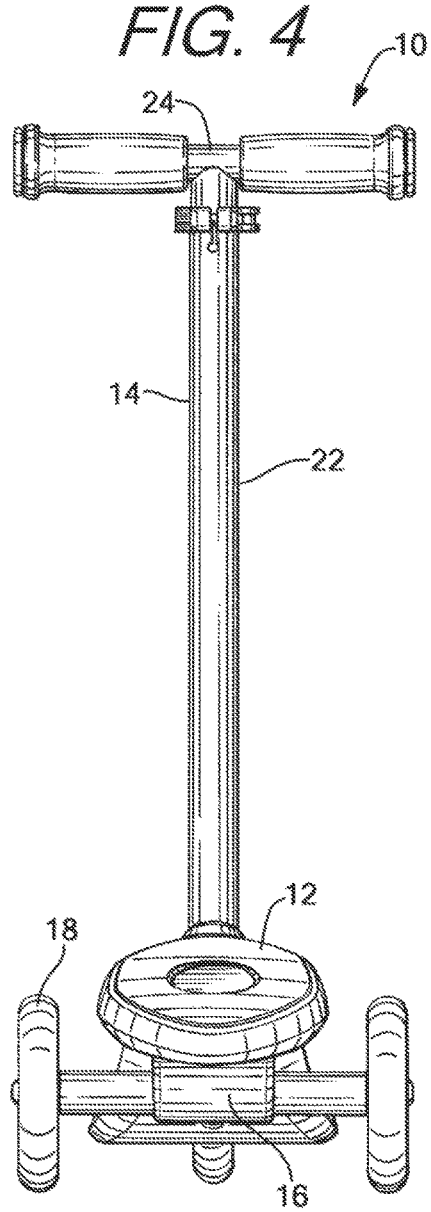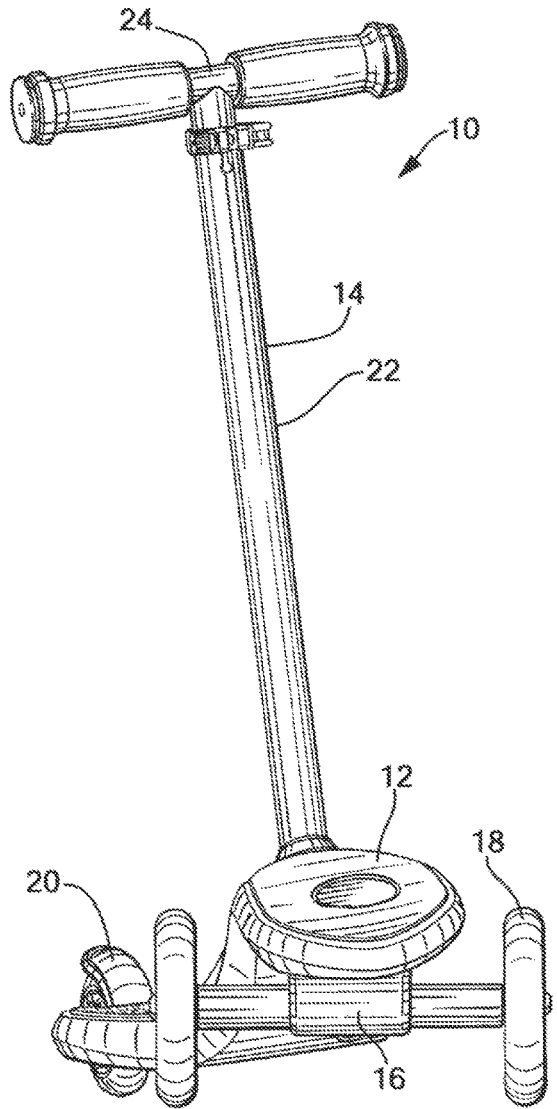

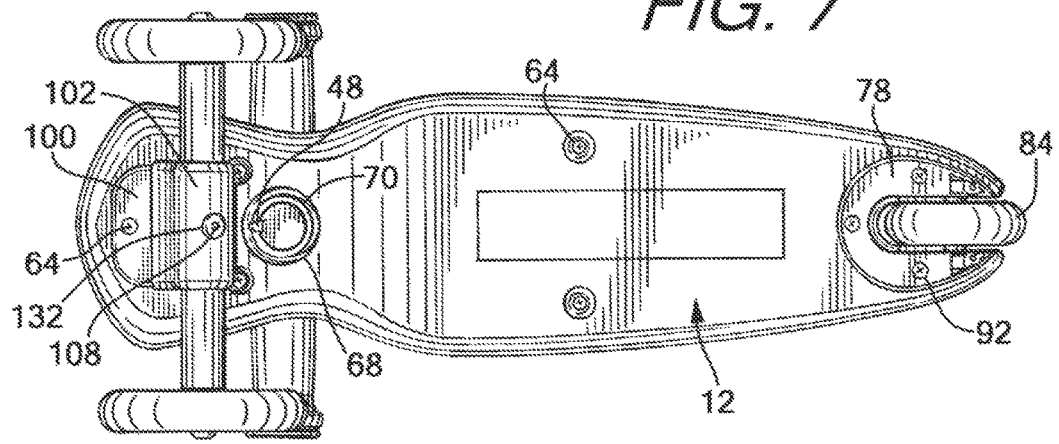
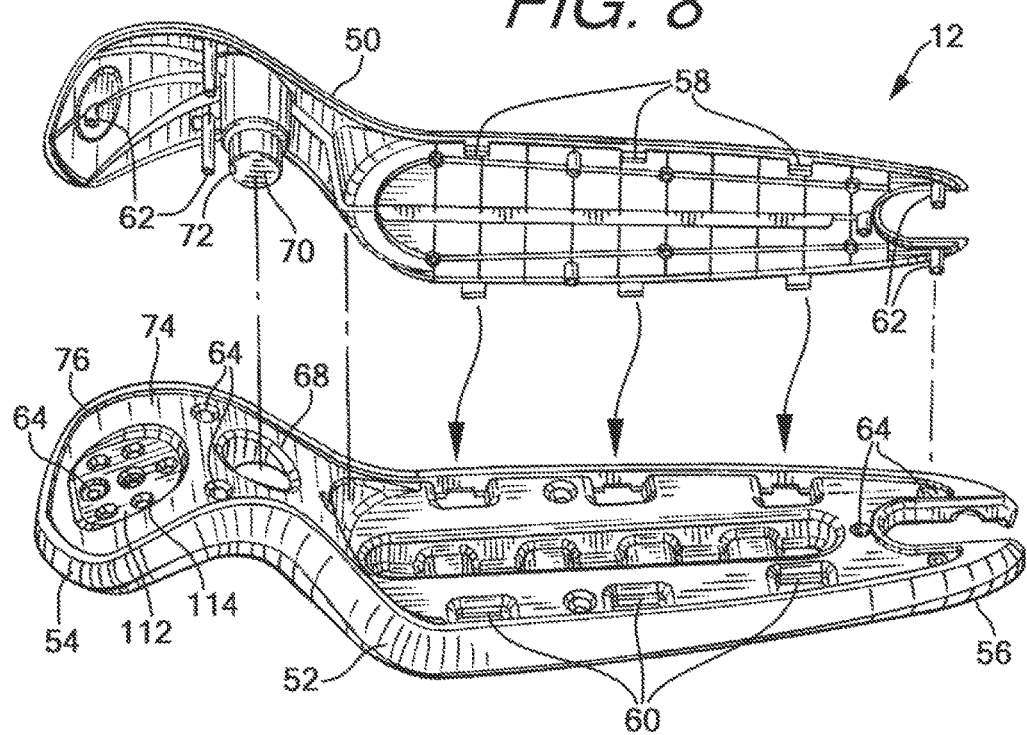

STEERING MECHANISM FOR SCOOTER

CROSS-REFERENCE TO RELATED APPLICATIONS

This application claims the benefit of U.S. Provisional Patent Application No. 62/085,750, filed Dec. 1, 2014, which is expressly incorporated herein by reference and made a part hereof.

FEDERALLY SPONSORED RESEARCH OR DEVELOPMENT

Not Applicable.

TECHNICAL FIELD

The present disclosure generally relates to a scooter. In particular, the disclosure is directed to a steering mechanism for a scooter.

BACKGROUND OF THE INVENTION

Scooters are well known in the art. While such scooters according to the prior art provide a number of advantages, they nevertheless have certain limitations. The present invention seeks to overcome certain of these limitations and other drawbacks of the prior art, and to provide new features not heretofore available. A full discussion of the features and advantages of the present invention is deferred to the following detailed description, which proceeds with reference to the accompanying drawings.

SUMMARY

According to one embodiment, the disclosed subject technology relates to scooter that has a steering mechanism that assists in rotating the scooter deck with respect to the front axle to rotate the front axle back toward the center after a force has been applied to turn the scooter. The steering mechanism also provides stops to prevent overturning of the steering mechanism in either direction.

The disclosed subject technology further relates to a scooter comprising: a deck; a handlebar connected to the deck; a front wheel assembly provided adjacent a proximal end of the deck, the front wheel assembly having a front axle and a front wheel, and a rear wheel assembly provided adjacent a distal end of the deck; and, a steering mechanism between the deck and the front wheel assembly.

The disclosed subject technology further relates to a steering mechanism comprising: a steering post extending in a direction generally perpendicular to a longitudinal axis of the front axle; a longitudinally extending spring member provided around the steering post, the spring member having a first end and a second end; a steering housing connected to the front axle, the steering housing having a first spring member cavity to receive the first end of the spring member, the steering housing also having a first steering limiter wall and a second steering limiter wall; a bottom fixture having a second spring member cavity to receive a second end of the spring member; a bushing around a portion of the spring member, the bottom fixture positioned on one side of the bushing and the steering housing positioned on an opposing side of the bushing; a first stop that engages the first steering limiter wall in a first direction; and, a second stop that engages the second steering limiter wall in the second direction.

The disclosed subject technology further relates to a scooter comprising: a deck having a proximal end and a distal end; a handlebar connected to the deck adjacent the proximal end; a front wheel assembly provided adjacent the proximal end of the deck, the front wheel assembly having a front axle and a front wheel, and a rear wheel assembly provided adjacent the distal end of the deck; and, a steering mechanism between the deck and the front wheel assembly. In one embodiment, the steering mechanism comprises: a steering post connected to the front axle and extending in a direction generally perpendicular to a longitudinal axis of the front axle, the steering post having a second end connected to the deck; a spring member provided around the steering post and between the deck and the front axle, the spring member having a plurality of transverse planar surfaces; a first spring member cavity adjacent the front axle to receive a first end of the spring member, the first spring member cavity having mating planar surfaces to receive the transverse planar surfaces of the spring member; a second spring member cavity adjacent the deck to receive a second end of the spring member, the second spring member cavity having mating planar surfaces to receive the transverse planar surfaces of the spring member; and, a first bushing positioned between the deck and the front axle to allow the deck to rotate with respect to the front axle.

The disclosed subject technology further relates to a scooter where the steering post extends through the spring member and bottom fixture, and is secured to the deck.

The disclosed subject technology further relates to a scooter where the stops for the steering mechanism extend from the deck toward the steering housing.

The disclosed subject technology further relates to a scooter where the spring member of the steering assembly has a central longitudinal bore through which the steering post extends. The central bore extends from the first end to the second end of the spring member.

The disclosed subject technology further relates to a scooter where the spring member for the steering assembly has a plurality of external planar surfaces. Additionally, the first and second spring member cavities in the steering housing and bottom fixture, respectively, have corresponding internal planar surfaces.

The disclosed subject technology further relates to a scooter where the spring member of the steering assembly is a urethane spring having a first end and a second end, wherein a bore extends through the spring from the first end to the second end about a longitudinal axis of the spring member, and wherein the plurality of transverse planar surfaces of the spring member extend from the first end to the second end of the spring member.

The disclosed subject technology further relates to a scooter where the first spring member cavity to receive the first end of the spring member is provided in the steering housing, and where the second spring member cavity to receive the second end of the spring member is provided in the bottom member.

The disclosed subject technology further relates to a scooter where the bushing of the steering mechanism is provided between the steering housing and the bottom member to allow the steering housing to rotate with respect to the bottom member about a longitudinal axis of the steering post. In an alternate embodiment the steering mechanism further comprises a second bushing adjacent the first bushing, the first and second bushings being provided around a portion of the spring member, the first and second bushings assisting the deck to be able to rotate with respect to the front axle.

The disclosed subject technology further relates to a scooter having a steering mechanism having a first steering limiter wall and a second steering limiter wall, a first stop that engages the first steering limiter wall in a first direction, and a second stop that engages the second steering limiter wall in the second direction, the first and second stops extending from the scooter deck.

The disclosed subject technology further relates to a scooter wherein the deck comprises a deck body and a deck cover secured to the deck body, wherein the deck body is made from a first manufacturing process with a first material, and wherein the deck cover is made from a second manufacturing process with a second material. In one embodiment, the deck body is manufactured through a blow molding process, and the deck cover is manufactured through an injection molding process.

The disclosed subject technology further relates to a scooter comprising: a deck having a proximal end and a distal end; a handlebar connected to the deck adjacent the proximal end; a front wheel assembly provided adjacent the proximal end of the deck, the front wheel assembly having a front axle and a front wheel, and a rear wheel assembly provided adjacent the distal end of the deck; a steering mechanism between the deck and the front wheel assembly to allow the deck to rotate with respect to the front axle to assist in turning the scooter; and, wherein the deck comprises a deck cover secured to a deck body, wherein the deck cover has a receiver for securing the handlebar to the deck, and wherein the deck cover is made of a first manufacturing process and the deck body is made of a second manufacturing process different from the first manufacturing process.

It is understood that other embodiments and configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

To understand the present disclosure, it will now be described by way of example, with reference to the accompanying drawings in which embodiments of the disclosures are illustrated and, together with the descriptions below, serve to explain the principles of the disclosure.

FIG. 4 is a front view of the scooter of FIG. 1.

FIG. 5 is a front view of another embodiment of the scooter of FIG. 1.

FIG. 7 is a bottom view of the scooter of FIG. 1.

FIG. 8 is a partial exploded view of the deck of the scooter of FIG. 1.

DETAILED DESCRIPTION

Figure 1:
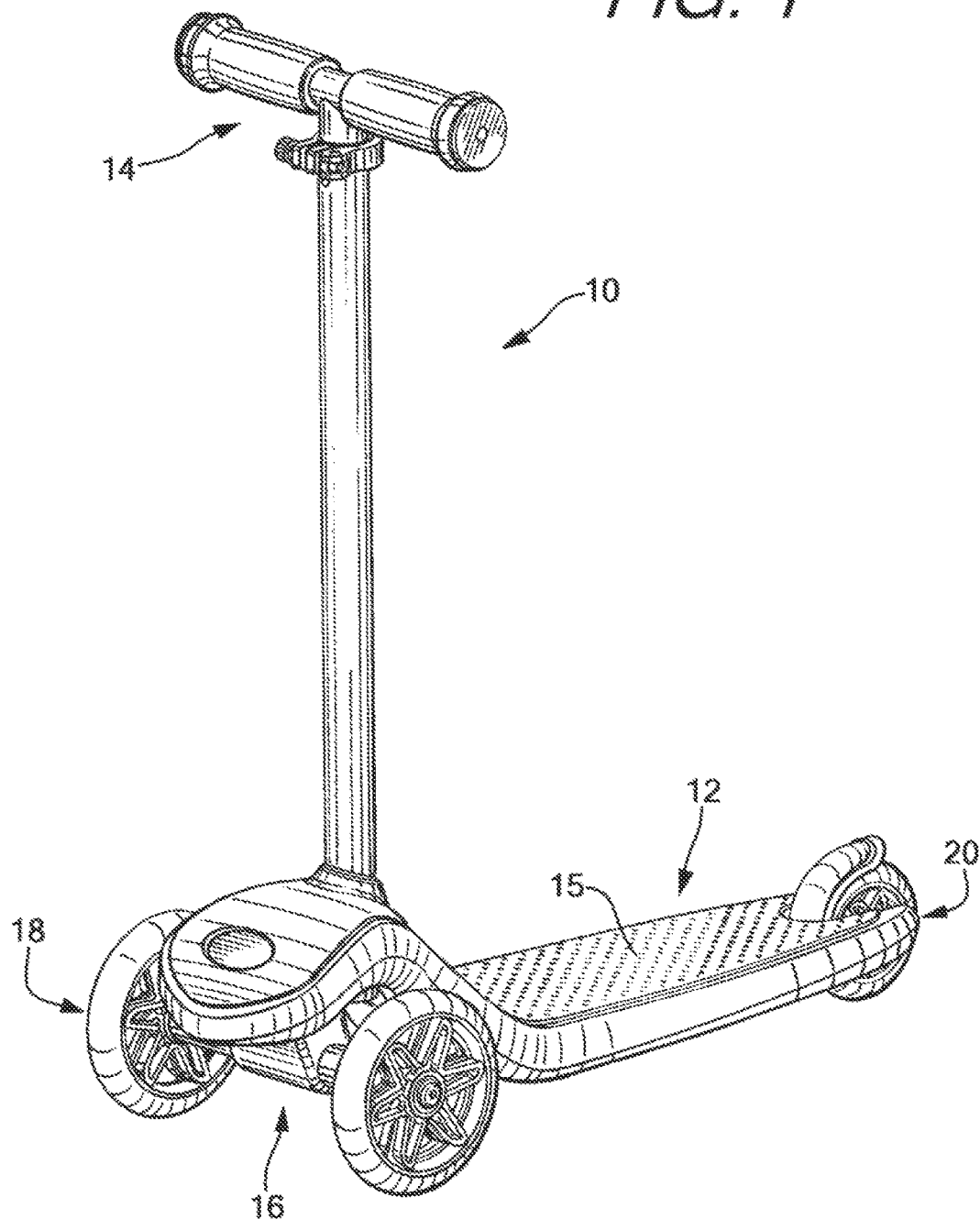
FIG. 1 is a front perspective view of an embodiment of a scooter.

While the scooter discussed herein is susceptible of embodiments in many different forms, there is shown in the drawings, and will herein be described in detail, preferred embodiments with the understanding that the present description is to be considered as an exemplification of the principles of the scooter and is not intended to limit the broad aspects of the disclosure to the embodiments illustrated.

Figure 2:
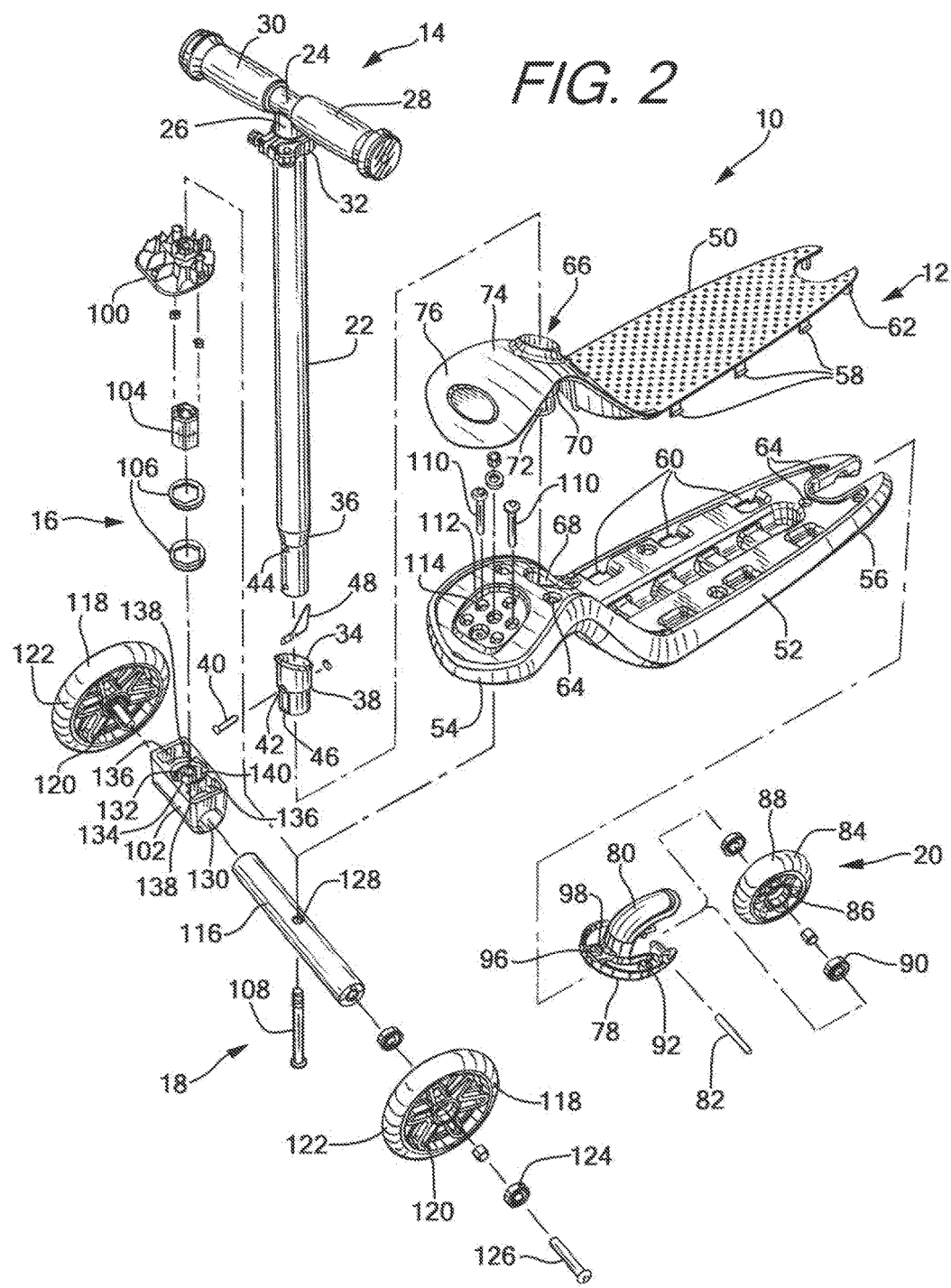
FIG. 2 is an exploded front perspective view of the scooter of FIG. 1.

Referring now to the figures, and initially to FIGS. 1 and 2, in one embodiment, there is shown a scooter 10 that generally includes a deck assembly 12, a handlebar assembly 14 connected to the deck assembly 12, a steering mechanism 16, a front wheel assembly 18, and a rear wheel assembly 20. The scooter 10 is designed to allow the front wheel assembly 18 to tilt or turn with respect to the deck assembly 12 to assist in turning the scooter 10 when a user is riding the scooter 10.

In one embodiment the handlebar assembly 14 comprises a lower tube 22 that connects to the deck assembly 12 and an upper tube 24 that fits within the lower tube 22 in a telescoping manner. Preferably, the upper tube 24 and lower tube 22 are made of steel, aluminum or some other strong and/or rigid material. The lower tube 22 has an opening and a cavity (not shown) that receives the upper tube 24 and can house a portion of the upper tube 24 within the cavity thereof. The upper tube 24 has an extension portion 26 that fits within the cavity of the lower tube 22, and handle portions 28 extending from the extension portion 26. The upper tube 24 can be raised and lowered within the lower tube 22 to adjust the height of the handle portions 28. In one embodiment, a pair of handle portions 28 extends in opposite directions from the extension portion 26 of the upper tube 24. Additionally, the handle portions 28 may be fixedly connected and extending outwardly from the extension portion 26, or they may be able to be removed from the extension portion 26, such as for transport or storage. Grips 30 may be provided on the handle portions 28.

The handlebar assembly 14 may also comprise a clamp 32. The clamp 32 is utilized to secure the upper tube 24 in a specific telescoping position within the lower tube 22 so that the handle portions 28 of the handlebar assembly 14 can be set at different heights for different size users. In one embodiment the clamp 32 operates to squeeze the upper end of the lower tube 22 to exert a pressure force on the extension portion 26 of the upper tube 24 within the lower tube 22. By closing the clamp 32, a clamping force is exerted on the lower tube 24 to squeeze the lower tube 22 against the upper tube 24 and to secure the upper tube 24 in a specific telescoping position. When the clamp 32 is released, the upper tube 24 can be raised and lowered to a desired handlebar position for the user.

A bushing 34, such as a plastic bushing, is provided at the bottom portion of the lower tube 22. The bushing 34 assists in providing a secure fit between the handlebar assembly 14 and the deck assembly 12. Various types of materials for a plastic bushing include polypropylene, polycarbonate, nylon, etc. In one embodiment the lower tube 22 has a shoulder 36, and the bushing 34 has a mating shoulder 38, however neither shoulder is required. The lower tube 22 is inserted through the bushing 34 until the shoulder 38 on the bushing 34 engages the shoulder 36 on the lower tube 22. The bushing 34 is then fixed to the lower tube 22, such as with a bolt 40 that extends through an opening 42 in the bushing 34 and through an opening 44 in the lower tube 22. When the bushing 34 is connected to the lower tube 22, a portion of the lower tube 22 may extend out of the bushing 34 to assist in removably connecting the handlebar assembly 14 to the deck assembly 12. The bushing 34 may also have a slotted opening 46 to allow a spring clip 48 to pass through the bushing 34. The spring clip 48 is inserted into the lower opening in the lower tube 22 for connecting the handlebar assembly 14 to the deck assembly 12 as explained below.

Referring to FIGS. 2 and 8, in one embodiment the deck assembly 12 comprises a multi-part construction. In one embodiment, the deck assembly 12 comprises a deck cover 50 and a deck body 52. Alternately, however, the deck assembly 12 may comprise a single component that operates as both a deck body having a deck cover. The deck assembly 12 supports the handlebar assembly 14, steering mechanism 16, front wheel assembly 18, rear wheel assembly 20 and a rider. The deck assembly 12 has a proximal end 54 and a distal end 56. The steering mechanism 16 and front wheel assembly 18 are provided at the proximal end 54 of the deck assembly 12, and the rear wheel assembly 20 is provided at the distal end 56 of the deck assembly 12.

In one embodiment, where a deck cover 50 is provided, the deck cover 50 is secured to the deck body 52. The deck cover 50 may have a plurality of connectors 58 and the deck body 52 may have a plurality of mating receivers 60 to receive and secure the connectors 58 thereto. In one embodiment, a plurality of the connectors 58 comprise resilient hooks 58, and a plurality of the mating receivers 60 comprise openings 60 that receive the resilient hooks 58 in a snap fit manner. Additional connectors 58 are also provided on the deck cover 50, such as bosses 62 with internal threads. In this embodiment the boss 62 style connectors 58 are located at the proximal 54 and distal 56 ends of the deck assembly 12. For example, in one embodiment, three boss 62 connectors 58 are provided at the proximal end 54 of the deck cover 50. The boss-style 62 connectors 58 are received in receivers 60 that are comprised of mating openings 64 in the deck body 52. Additionally, in one embodiment three boss-style 62 connectors 58 are provided at the distal end 56 of the deck cover 50 and three mating openings 64 are provided in the distal end 56 of the deck body 52, and two boss-style 62 connectors 58 are provided in the middle portion of the deck cover 50 and two mating openings 64 are provided in the middle portion of the deck body 52. The bosses 62 extending from the deck cover 50 fit into the mating openings 64 in the deck body 52 and then screws can be inserted from the underside of the deck body 52 and through the openings 64 and into the threaded receivers in the bosses 62 to further secure the deck cover 50 to the deck body 52.

Figure 6:
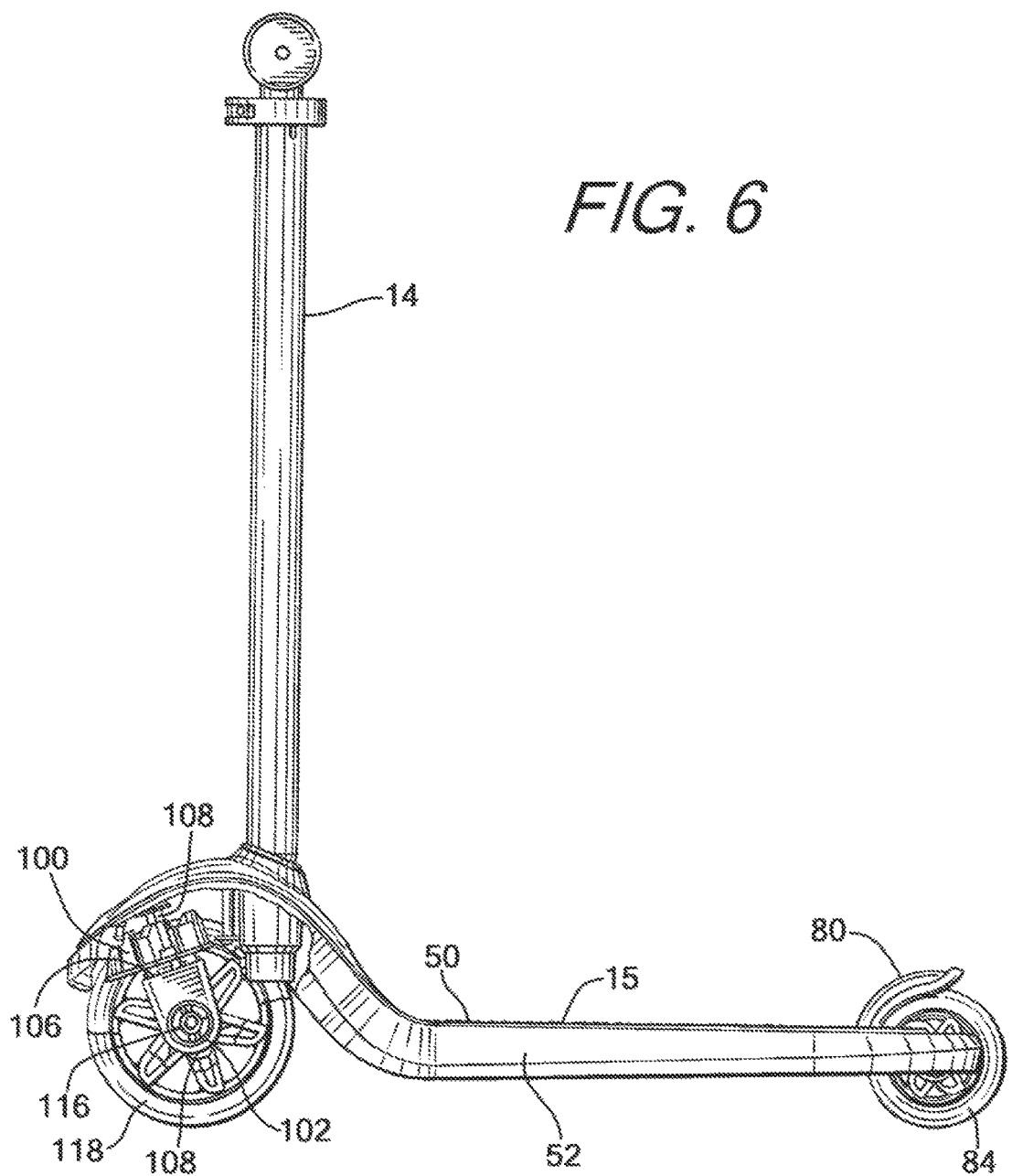
FIG. 6 is a side view of the scooter of FIG. 1 with one of the front wheels removed.

The deck assembly 12 also has a receiver 66 for receiving the handlebar assembly 14. In one embodiment, the receiver 66 is an opening in the deck assembly 12 to receive the bushing 34 and lower tube 22 of the handlebar assembly 12. In a more preferred embodiment, the deck assembly 12 has an aperture 68 in the deck body 52, and a receiver housing 70 in the deck cover 50. The receiver housing 70 receives the handlebar assembly 14 and secures the handlebar assembly 14 thereto, and the receiver housing 70 extends into and through the aperture 68 in the deck body 52. In a most preferred embodiment, the lower tube 22 of the handlebar assembly 14, and the bushing 34 that is connected thereto, are inserted into the receiver housing 70 in the deck cover 50. In one embodiment, the outer surface of the bushing 34 at least partially mates with the inner surface of the receiver housing 70 to secure the handlebar assembly 14 in the receiver housing 70. More preferably, however, the receiver housing 70 has an opening 72 that receives a portion of the spring clip 48 in the lower portion of the lower tube 22. When the push-button portion of the spring clip 48 is received in the opening 72 in the receiver housing 70, the handlebar assembly 14 is locked to the deck assembly 12. To remove the handlebar assembly 14 from the deck assembly 12, one can push the push-button portion of the spring clip 48 inwardly and toward the lower tube 22 so that it clears the opening 72 in the receiver housing 70. Then, the handlebar assembly 14 can be lifted from the deck assembly 12 and removed. The handlebar assembly 14 can be reinserted into the deck assembly 12 merely by inserting the handlebar assembly 14 back into the receiver housing 70 until the spring clip 48 re-engages the opening 72 to lock the handlebar assembly 14 in place. Accordingly, in a preferred embodiment, the handlebar assembly 14 does not move within the receiver housing 70 and thus does not move with respect to the deck assembly 12 when it is connected to the deck assembly 12. Additionally, as shown in FIG. 6, in a preferred embodiment the handlebar assembly 14 is preferably orientated at a 90° angle to the standing portion 15 of the deck assembly 12.

In one embodiment, as shown in the figures, the proximal end 54 of the deck assembly 12 has a raised portion 74. In one embodiment, the handlebar assembly 14 engages the deck assembly 12 adjacent the raised portion 74 thereof. Additionally, in one embodiment the proximal end 54 of the deck assembly 12 has an angled portion 76. In one embodiment, the steering mechanism 16 is secured to the deck assembly 12 adjacent the angled portion 76 of the deck assembly 12. As shown in FIG. 6, in a preferred embodiment, the front wheel assembly 18 is connected to the deck assembly 12 at an angle so that the front wheel assembly 18 can be in a caster orientation. Having the proximal portion 54 of the deck assembly 12 where the front wheel assembly 18 is connected thereto assists in providing the front wheel assembly 18 in the caster orientation.

In one embodiment, the deck cover 50 and the deck body 52 are made of different materials using different manufacturing techniques to provide improved strength, aesthetics and cost. However, it is understood that the deck cover 50 and deck body 52 may be made of the same materials utilizing the same manufacturing techniques. Alternately, the deck cover 50 and deck body 52 may be a single unitary component. However, in a preferred embodiment, the deck cover 50 is made from an injection molding technique, and the deck body 52 is made from a blow molded technique. Generally, blow molded components are less expensive than injection molded components, but by combining the two techniques reduced cost can be achieved while still maintaining preferred aesthetic and strength targets as desired. For example, in one embodiment, the deck body 52 is made of a polyethylene that is blow molded. Using this technique for the deck body 52 allows the part to be hollow to reduce weight and material. Additionally, ribs and other structural components can be designed into the blow molded part, and then they can be covered by the more aesthetically pleasing, but more expensive and heavier, injection molded part. The deck cover 50, however, being made from an injection molded technique, with thermoplastics or thermoset materials, can provide a high quality finish on the top surface, and it also can be made with tighter tolerances than the blow molded part, which is required for various connections made between the deck cover 50 and other components of the scooter 10. Further, the injection molded deck cover 50 component can be made with a top surface having a coarse texture or gripping surface. Moreover, the injection molded deck cover 50 can have a top film component thereto that is made of the same material as the injection mold material. The top film component can incorporate certain graphics to make the deck cover 50 have additional aesthetic appeal. In one embodiment, the deck body 52 is made from a first manufacturing process with a first material, and the deck cover 50 is made from a second manufacturing process with a second material As shown in FIGS. 1, 2, 7 and 8, the rear wheel assembly 20 is also connected to the deck assembly 12, however, the rear wheel assembly 20 is connected to the deck assembly 12 at the distal end 56 of the deck assembly 12. In one embodiment, the rear wheel assembly 20 comprises a rear wheel housing 78, a rear fender 80, a rear axle 82 and a wheel assembly 84. The wheel assembly 84 is preferably a single component made of a hub 86, a tread 88 and one or more bearings 90. The wheel assembly 84 rides on the rear axle 82. The rear axle 82 is received in receivers, such as bosses, extending from the rear wheel housing 78, and the rear axle 82 is maintained in the bosses through a pressure fit, and the wheel assembly 84 rotates on the rear axle 82.

Referring to FIGS. 2, 7 and 8, the rear wheel housing 78 is preferably connected to the deck body 52 at a bottom of the distal end 56 of the deck body 52. As explained herein, a plurality of boss-style 62 connectors 58, which in one embodiment comprise three boss-style connectors 58, are provided on the underside of the proximal end 54 of the deck cover 50. The three boss-style 62 connectors 58 are received in mating openings 64 in the deck body 52. Additionally, the rear wheel housing 78 has three mating openings 92 for the three boss-style connectors 58. The rear wheel housing 78 mates with a recess in the bottom of the deck body 52, and the openings 92 in the rear wheel housing 78 mate with the openings 64 in the deck body 52. Accordingly, to connect the rear wheel housing 78 to the deck assembly 12, screws can be inserted from the underside of the deck body 52 and through the openings 92 in the rear wheel housing 78, through the openings 64 in the deck body 52, and into the threaded receivers in the bosses 62 in the deck cover 50. This will operate to secure the rear wheel assembly 20, including the rear wheel housing 78, as well as the deck body 52 to the deck cover.

The rear fender 80 of the rear wheel assembly 20 operates as both a fender and a brake. The rear fender 80 is connected to the scooter 10 as part of the rear wheel housing 78. The rear fender 80 has a flange 96 with an opening 98 that mates with the middle opening 92 in the rear wheel housing 78. When the rear wheel housing 78 is secured to the deck assembly 12, the rear fender 80 is connected between the rear wheel housing 78 and the deck body 52 via the flange 96 and opening 98, so that the screw goes through the opening 92 in the rear wheel housing 78, the opening 98 in the rear fender 80, the opening 64 in the deck body 52 and then into the threaded receiver in the bosses 62 in the deck cover 50.

In a preferred embodiment, the rear wheel housing 78 is an injection molded component and is preferably made of a material such as polypropylene. The fender 80, however, while also preferably made of an injection molding technique to achieve appropriate tolerances and use of preferred materials, is preferably made of a nylon material. The nylon material provides increased strength required for the fender/brake functionality.

Figure 3:
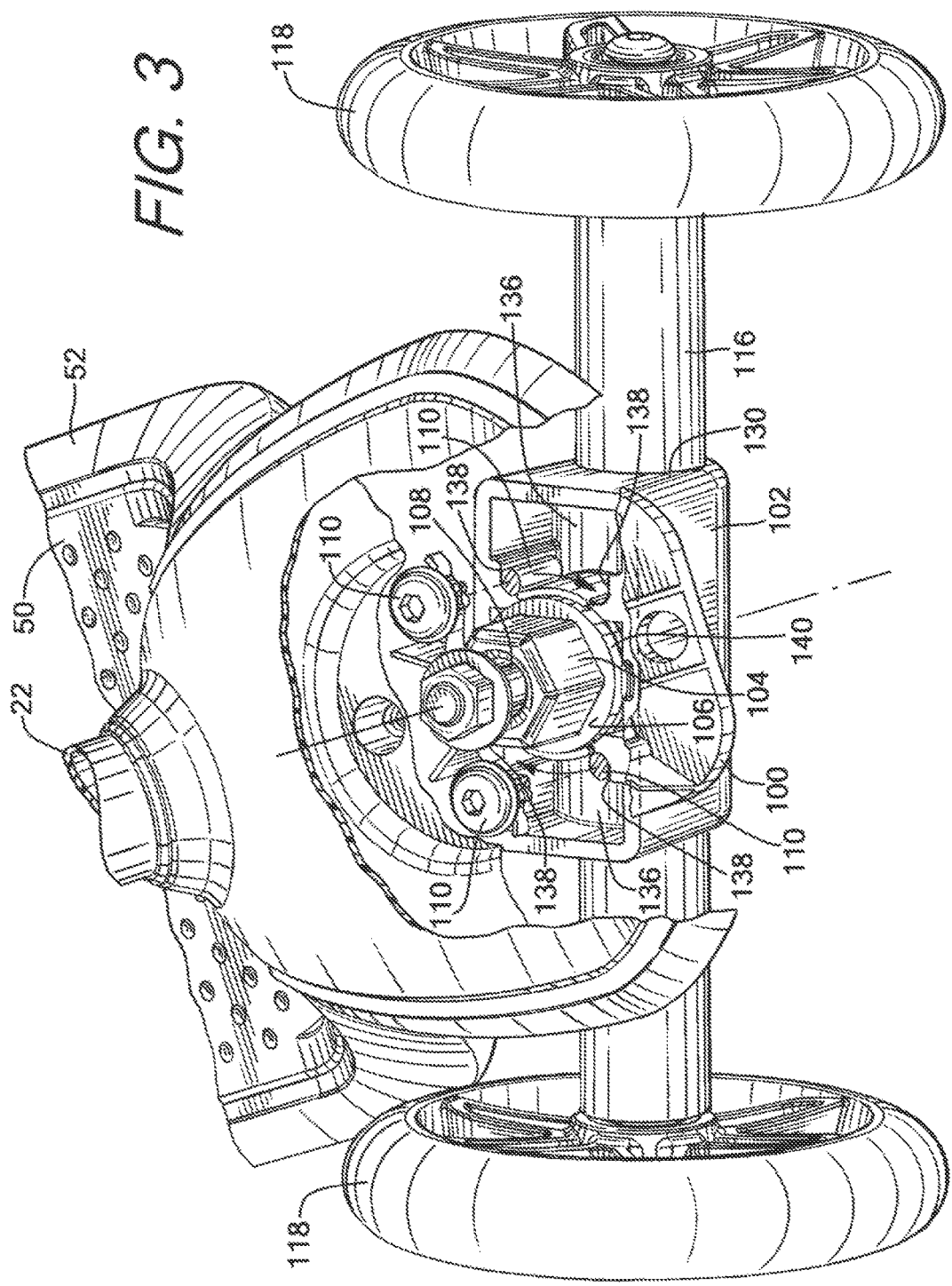
FIG. 3 is a front partial cut-away view of the scooter of FIG. 1 showing one embodiment of a steering mechanism.

In a preferred embodiment, the steering mechanism 16 is connected to the deck assembly 12 and the front wheel assembly 18, and preferably between the deck assembly and the front wheel assembly. Further, in a more preferred embodiment, the steering mechanism 16 is secured to the deck body 52 and the front wheel assembly 18. As shown in FIGS. 2, 3 and 8, in one embodiment the steering mechanism 16 comprises a bottom fixture 100, a steering housing 102, a spring member 104, which is preferably a urethane spring 104, a plurality of plastic washers 106 used as bushing surfaces, a steering post 108, and two stops 110. The deck body 52 has a recess 112 with a plurality of apertures 114 for securing the components of the steering mechanism 16 to the deck body 52.

The front wheel assembly 18 in the embodiment shown in FIG. 2 is connected to the proximal end 54 of the deck assembly 12, and in one embodiment generally comprises a front axle 116 and two front wheel assemblies 118, one at each end of the front axle 116. Preferably, the front axle 116 is made of an extruded aluminum tube with threads at each end to screw in each wheel assembly 118. Each of the wheel assemblies 118 are preferably a single wheel assembly, similar to the wheel assembly 86 used in the rear wheel assembly 20, made of a hub 120, a tread 122 and one or more bearings 124. One wheel assembly 118 is rotatedly connected to one end of the front axle 116, such as with a shoulder bolt 126 that provides a rotatable surface for the wheel assembly 118, and the other wheel assembly 118 is rotatedly connected to the other end of the front axle 116, similarly such as with a shoulder bolt that provides a rotatable surface for the wheel assembly 118.

As best shown in FIGS. 2, 3 and 6, in one embodiment the front wheel assembly 18 is connected to the deck assembly 12 via the steering post 108. In one embodiment, the steering post 108 extends in a direction generally perpendicular to a longitudinal axis of the front axle 116. The front axle 116 has an aperture 128 through which the steering post 108 passes and which allows the steering post 108 to be connected to the front axle 116. The aperture 128 extends transverse to a longitudinal axis of the front axle 116. First, however, the front axle 116 is inserted through the steering housing 102. The steering housing 102 has an aperture 130 extending through the housing 102 to receive and support the front axle 116. The steering housing 102 also has a central aperture 132 to receive the steering post 108. The central aperture 132 is transverse to the aperture 130 for the front axle 116. As shown in FIGS. 2, 3 and 6, the first end of the steering post is provided adjacent the front axle, and the second end of the steering post is connected to the deck to secure the steering assembly to the deck.

When the front axle 116 is inserted through the aperture 130 in the steering housing 102 and the central aperture 132 is aligned with the aperture 128 in the front axle, the steering post 108 can be inserted into both apertures 128, 132 so that the steering post 108 extends through the front axle 116 and the steering housing 102. Accordingly, the steering housing 102 is connected to the front axle 116. The steering housing 102 also has a recessed cavity 134, also referred to as a first spring member cavity 134, for receiving a first end of the spring member 104. The recessed cavity 134 is generally transverse to aperture 130, and concentric with the central aperture 132 for the steering post 108.

In a preferred embodiment the spring member 104 is a longitudinally extending member having a first end and a second end, and which has a plurality of transverse planar surfaces and a central longitudinal bore, all of which preferably extend from the first end to the second end of the spring member 104. In a preferred embodiment the plurality of transverse planar surfaces of the spring member form an elongated hexagonal shape for the spring member 104. Further, in a preferred embodiment the spring member 104 is made of an elastic urethane material to operate as a spring. Accordingly, the steering post 108 extends through the spring member 104, and the spring member 104 is therefore provided around the steering post 108 in a preferred embodiment. The central bore in the spring member 104 allows the steering post 108 to pass through the center of the spring member 104. Because the perimeter of the preferred spring member 104 has a plurality of transverse planar surfaces forming a hexagonal shape, it is preferred that the female recessed cavity 134, i.e., the first spring member cavity 134, in the steering housing 102 will also have mating internal transverse planar surfaces, such as a hexagonal shape, to receive and mate with the perimeter of the spring member 104. While a hexagonal shape is used for the spring member 104 and the recessed cavity 134, alternative geometric shapes can be utilized to allow for force transmission to be applied to the spring member 104 through the recessed cavity 134, and vice-versa. Finally, in a preferred embodiment, the steering housing 102 may also have a counterbore 140 to seat and receive at least a portion of one of the plastic washers 106.

Figure 3A:
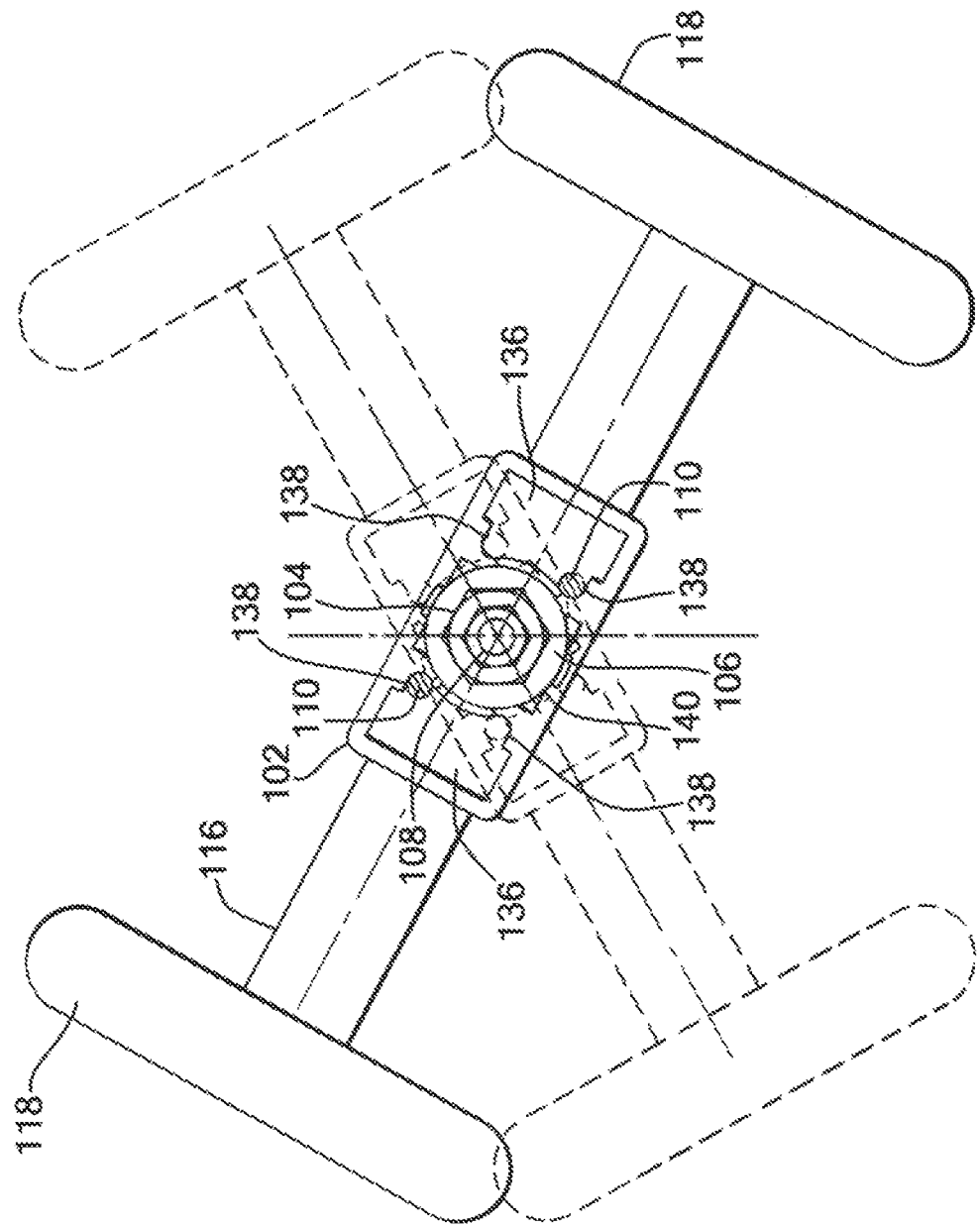
FIG. 3A is a schematic of the steering mechanism and front wheel assembly of one embodiment of a scooter.

As shown in FIGS. 3 and 3A, the steering housing 102 also has two opposing cavities 136 with walls 138 that operate as steering limiters for the steering mechanism 16. As shown in FIGS. 3 and 3A, each cavity 136 has two walls 138 so that the steering mechanism 16 has stop limits in both directions, i.e., turning left and turning right. The steering limiter walls 138 are engaged by the stops 110 extending down from the deck assembly 12 and through the bottom fixture 100 of the steering assembly 12. The stops 110 are retained in position and remain fixed by the bottom fixture 100 and deck assembly 12. As explained herein, when the user leans to the right to turn the scooter 10 to the right, and if sufficient leaning force is applied by the user to overcome the spring force of the spring member 104, the deck assembly 12 will pivot and the front wheel assembly 18 will turn right as shown in FIG. 5. However, the amount of turning by the front wheel assembly 18 is limited by the stops 110 engaging the wall limiters 138 in the steering housing 102 as the steering housing 102 rotates between the two plastic washers 106 (described herein) and on the axis of the steering post 108. When the user no longer leans to the right, the spring member 104 will tend to force the front wheel assembly 18 back to the center so that the scooter 10 will go generally straight, as shown in FIG. 4. If the user wants to turn left, the user will lean to the left, and if they can overcome the spring force of the spring member 104, the deck assembly 12 will pivot to the left and the front wheel assembly will turn left. Again, the amount of turning to the left is limited by the stops 110 engaging opposing wall limiters 138 in the steering housing 102. Then, when the user no longer leans to the left, the spring member 104 will tend to force the front wheel assembly 18 back to the center so that the scooter 10 will go generally straight again, as shown in FIG. 4.

Referring to FIGS. 2, 3 and 6, in one embodiment the first plastic washer 106, also referred to as a bushing, generally resides in the counterbore 140 in the steering housing 102. The second plastic washer 106, similarly referred to as a bushing, generally resides adjacent the first plastic washer 106, however, the second plastic washer 106 is outside the steering housing 102 and against the bottom fixture 100 of the steering mechanism 16. In a preferred embodiment the bushings 106 are provided around a portion of the spring member 104. Preferably, rotation of the steering mechanism 16 and front wheel assembly 18, with respect to the deck assembly 12, occurs between the two plastic washers 106. Accordingly, the two plastic washers 106 operate as bushing surfaces to allow the steering mechanism 16 and front wheel assembly 18 to rotate about the steering post 108 by allowing rotation between the two plastic washers 106. Preferably, the bottom fixture 100 is positioned on one side of the second bushing 106 and the steering housing is positioned on an opposing side of the first bushing 106.

The bottom fixture 100 also has a corresponding female recessed cavity, referred to as the second spring member cavity, with a plurality of internal transverse planar surfaces to receive the second end of the spring member 104 as shown in FIGS. 2 and 3. In a preferred embodiment, the second spring member cavity has an internal or female hexagonal shape to receive and mate with the male hexagonal shape of the second end of the spring member 104. While a hexagonal shape is used for the spring member 104 and the second spring member cavity, alternative geometric shapes can be utilized to allow for force transmission to be applied to the spring member 104 through the second recessed cavity, and vice-versa.

The steering post 108 and spring member 104 also extends through the openings in the two plastic washers 106 and also through the second spring member cavity in the bottom fixture 100. The bottom fixture 100 is positioned between the bottom of the deck body 52 and the second plastic washer 106. More preferably, the bottom fixture 100 is positioned within a recess in the bottom of the deck body 52, as shown in FIG. 7. The bottom fixture 100 is preferably a rigid injection molded component that helps to properly position and retain the spring member 104, steering post 108 and stops 110 in their proper positions. The steering post 108 further extends through the bottom fixture 100 and up through the deck body 52 where it is fixed with a washer and bolt to the deck. Thus, the steering post 108 is fixed at two ends by the top surface of the deck body 52 and the bottom surface of the steering housing 102. The front wheel assembly 18 rotates about the longitudinal axis of the steering post 108. Further, the steering mechanism 16 also rotates about the longitudinal axis of the steering post 108. Finally, the deck body 52, bottom fixture 100, two plastic washers 108, urethane spring 104, front axle 116 and steering housing 102 are sandwiched between the two ends of the steering post 108.

Several alternative examples have been described and illustrated herein. A person of ordinary skill in the art would appreciate the features of the individual embodiments, and the possible combinations and variations of the components. A person of ordinary skill in the art would further appreciate that any of the examples could be provided in any combination with the other examples disclosed herein. Additionally, the terms "first," "second," "third," and "fourth" as used herein are intended for illustrative purposes only and do not limit the embodiments in any way. Further, the term "plurality" as used herein indicates any number greater than one, either disjunctively or conjunctively, as necessary, up to an infinite number. Additionally, the word "including" as used herein is utilized in an open-ended manner.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. The present examples and embodiments, therefore, are to be considered in all respects as illustrative and not restrictive, and the invention is not to be limited to the details given herein. It is intended by the following claims to claim any and all applications, modifications and variations that fall within the true scope of the present teachings. Accordingly, while the specific embodiments have been illustrated and described, numerous modifications come to mind without significantly departing from the spirit of the invention and the scope of protection is only limited by the scope of the accompanying Claims.

What is claimed is:

1. A scooter comprising:
   a deck;
   a handlebar connected to the deck;
   a front wheel assembly provided adjacent a proximal end of the deck, the front wheel assembly having a front axle and a front wheel, and a rear wheel assembly provided adjacent a distal end of the deck; and,
   steering mechanism between the deck and the front wheel assembly, the steering mechanism comprising:
      a steering post extending in a direction generally perpendicular to a longitudinal axis of the front axle;
      a longitudinally extending spring member provided around the steering post, the spring member having a first end and a second end;
      a steering housing connected to the front axle, the steering housing having a first spring member cavity to receive the first end of the spring member, the steering housing also having a first steering limiter wall and a second steering limiter wall;
      a bottom fixture having a second spring member cavity to receive a second end of the spring member;
      a bushing positioned around a portion of the spring member and between ends of the spring member, the bottom fixture positioned on one side of the bushing and the steering housing positioned on an opposing side of the bushing;
      a first stop that engages the first steering limiter wall in a first direction; and,
   a second stop that engages the second steering limiter wall in the second direction.

2. The scooter of claim 1, wherein the steering post extends through the spring member and bottom fixture, and is secured to the deck.

3. The scooter of claim 1, wherein the stops extend from the deck toward the steering housing.

4. The scooter of claim 1, wherein the front wheel assembly comprises first and second front wheels connected to the front axle.

5. The scooter of claim 1, wherein the spring member has a central longitudinal bore through which the steering post extends, the central bore extending from the first end to the second end of the spring member.

6. The scooter of claim 1, wherein the spring member has a plurality of external planar surfaces, and wherein the first and second spring member cavities in the steering housing and bottom fixture, respectively, have corresponding internal planar surfaces.

7. The scooter of claim 1, wherein the deck has a recess with a plurality of apertures for securing the first stop, second stop and steering post.

8. The scooter of claim 1, wherein the deck comprises a deck body and a deck cover secured to the deck body.

9. A scooter comprising:
   a deck having a proximal end and a distal end;
   a handlebar connected to the deck adjacent the proximal end;
   a front wheel assembly provided adjacent the proximal end of the deck, the front wheel
   assembly having a front axle and a front wheel, and a rear wheel assembly provided adjacent the distal end of the deck; and,
   a steering mechanism between the deck and the front wheel assembly, the steering mechanism comprising:
      a steering post connected to the front axle and extending in a direction generally perpendicular to a longitudinal axis of the front axle, the steering post having a second end connected to the deck;
      a spring member provided around the steering post and between the deck and the front axle, the spring member having a plurality of transverse planar surfaces;
      a first spring member cavity adjacent the front axle to receive a first end of the spring member, the first spring member cavity having mating planar surfaces to receive the transverse planar surfaces of the spring member;
      a second spring member cavity adjacent the deck to receive a second end of the spring member, the second spring member cavity having mating planar surfaces to receive the transverse planar surfaces of the spring member; and,
      a first bushing positioned between the deck and the front axle to allow the deck to rotate with respect to the front axle, the spring member extending through an opening in the first bushing such that a first end of the spring member is on one side of the first bushing and the second end of the spring member is on an opposing side of the first bushing.

10. The scooter of claim 9, wherein the steering mechanism further comprises a steering housing adjacent the front axle, the first spring member cavity to receive the first end of the spring member being provided in the steering housing.

11. The scooter of claim 10, wherein the steering mechanism further comprising a bottom member positioned between the deck and the steering housing, the second spring member cavity to receive the second end of the spring member being provided in the bottom member.

12. The steering housing of claim 9, wherein the deck comprises a deck body and a deck cover secured to the deck body, wherein the deck body is made from a first manufacturing process with a first material, and wherein the deck cover is made from a second manufacturing process with a second material.

13. The steering housing of claim 12, wherein the deck body is manufactured through a blow molding process, and wherein the deck cover is manufactured through an injection molding process.

14. The scooter of claim 9, wherein the steering mechanism further comprises a first steering limiter wall and a second steering limiter wall, a first stop that engages the first steering limiter wall in a first direction, and a second stop that engages the second steering limiter wall in the second direction, the first and second stops extending from the scooter deck.

15. The scooter of claim 9, wherein the steering mechanism further comprises a second bushing adjacent the first bushing, the first and second bushings being provided around a portion of the spring member such that the first end of the spring member is provided on one side of the first and second bushings and the second end of the spring member is provided on an opposing side of the first and second bushings, the first and second bushings assisting the deck to be able to rotate with respect to the front axle.

16. The steering housing of claim 9, wherein the spring member is a urethane spring having a first end and a second end, a bore extending through the spring from the first end to the second end about a longitudinal axis of the spring member, and wherein the plurality of transverse planar surfaces of the spring member extend from the first end to the second end of the spring member.

17. The scooter of claim 11, wherein the bushing of the steering mechanism is provided between the steering housing and the bottom member to allow the steering housing to rotate with respect to the bottom member about a longitudinal axis of the steering post.

\* \* \* \* \*